March 17, 1936. W. T. HANCOCK 2,034,094
OIL CRACKING STILL
Filed May 5, 1934
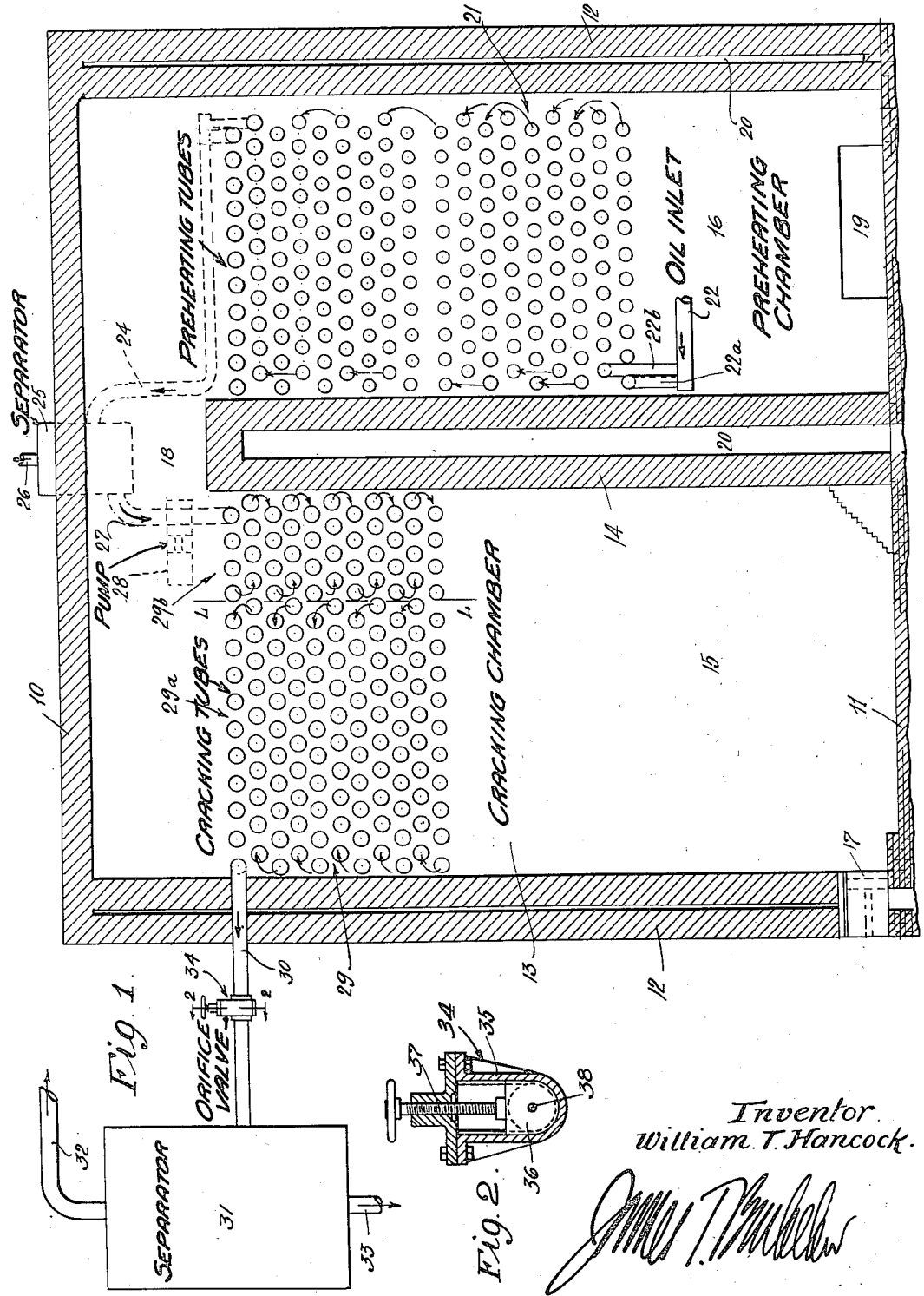
Inventor.
William T. Hancock.
Attorney.

Patented Mar. 17, 1936

2,034,094

UNITED STATES PATENT OFFICE 2,034,094

OIL CRACKING STILL

William T. Hancock, Long Beach, Calif.

Application May 5, 1934, Serial No. 724,135

9 Claims. (Cl. 196—110)

This invention deals generally with stills for heating petroleum oil, and in its more specific aspect has to do with oil cracking tube stills in which the oil is heated to cracking temperatures and maintained under regulated pressures, while being passed through one or more banks of externally heated tubes.

The degree to which an oil may be dissociated or cracked to produce a desired lighter product fraction, such as gasoline, is largely dependent upon the maintenance of certain more or less particular temperature, pressure and time conditions. The degree of cracking is also influenced by the rate at which the oil is heated to cracking temperature and the conditions under which the oil is maintained after reaching that temperature. I have found that by heating cracking stock, preferably oil that has been preheated, comparatively rapidly within a tube still to cracking temperature then maintaining the oil while yet in the tubes, under pressure over a comparatively extended period of time and at the cracking temperature, or with a somewhat gradual temperature drop, particularly high yields of cracked distillate may be produced. And moreover, the high yields may be obtained without excessive depositing of carbon within the cracking tubes, as ordinarily occurs where cracking is carried to a commensurate degree.

In carrying out the invention, I place within the combustion chamber of a still, a tube bank in which the individual tubes are so connected as to form what may be termed two sections, one of comparatively small aggregate tube length and heating surface area, and through which the oil is passed and heated to cracking temperature in a comparatively short period of time; and a second section of considerably greater aggregate tube length and heating surface through which the oil that has been rapidly raised to cracking temperature, flows during an extended period of time while being held at the cracking temperature or at gradually decreasing temperatures. Due to the oil being maintained at high temperature over an extended period of time in passing through the second mentioned section of the tube bank, all factors and reactions causing dissociation of the oil are allowed to work to completion, with the final result that a maximum yield of cracked distillate is produced.

I also provide in conjunction with the described cracking tube unit, a novel form of orifice fitting in the oil and vapor outlet leading from the tubes, the purpose of this fitting being to maintain a proper back pressure necessary to effect maximum conversion of the oil under existing temperature conditions. This fitting has an added utility in that it is adjustable to remove the restriction in the outlet line so that at times when it becomes necessary to clean the tubes, the accumulated carbon will be allowed free passage through the outlet line.

The above mentioned aspects, as well as additional features and objects of the invention, will be understood to best advantage from the following description of one typical and preferred form of the invention. Reference is had throughout the description to the accompanying drawing, in which:

Figure 1 is a sectional view of the still; and

Fig. 2 is an enlarged section on line 2—2 of Fig. 1, showing the orifice valve.

The still is shown diagrammatically as having top and bottom walls 10 and 11, side wall 12, and end walls 13. The interior of the still is separated by baffle wall 14 into two heating chambers, a radiant heating chamber 15 and a convection heating chamber 16, the former being fired by burners within the burner box diagrammatically indicated at 17. The hot combustion gases rise within chamber 15 and pass through space 18 above the baffle wall to then flow downwardly through chamber 16 and out the flue 19. The still walls are shown to have the usual heat insulating air spaces 20.

A bank 21 of oil preheating tubes is mounted within chamber 16, this tube bank comprising, in a typical instance, 175 to 200 twelve-foot lengths of four and one-half inch inside diameter tubes. Oil, preferably preheated to around 300° F., is fed to the lower end of tube bank 21 through header 22 and branch lines 22a, 22b connected with the two lower rows of tubes, the oil then flowing in alternate rows of tubes upwardly through the entire tube bank. In an average instance, the charging stock fed to the preheating tube bank will be an oil having a gravity in the neighborhood of 25° A. P. I. The preheated oil, which may be raised in temperature to around 500° F., passes from the upper end of tube bank 21 through line 24 into a vapor separator 25, which may be in the form of a simple flash chamber or a dephlegmator or fractionating column. The vapor passing from chamber 25 through line 26 may be condensed to a liquid fraction having a gravity in the neighborhood of 45° A. P. I., or the vapors may be fractionated to produce cuts corresponding in gravity to gasoline, kerosene, and possibly some heavier fraction.

The residuum is taken from chamber 25 through pipe 27 and is forced under pressure by pump 28 through tube bank 29 mounted in the high temperature combustion chamber 15 of the still. For convenience of description, tube bank 29 may be regarded as comprising two sections 29a, 29b through which the general direction of oil flow is in opposite directions, the relative widths of the sections being indicated by dotted line L—L. The tubes in the horizontal rows of each section are connected in series, as are also vertically adjacent horizontal rows, so that, for example in tube bank section 29b, the oil entering the top row of tubes from line 27, flows down through the section in the path indicated by the arrows. The tubes in the lowermost rows of both sections are connected in series so that upon reaching the lower end of tube bank 29b, the oil then passes into the bottom tubes of section 29a and then flows upwardly through that section in the path indicated by the arrows.

It will be noticed that the tube bank section 29a is substantially wider than section 29b, the former, in the particular instance illustrated, containing about two and one half times as many tubes as the narrower section. It follows, of course, that the tubes in the two sections have a corresponding ratio as to total aggregate lengths and outside heating surfaces. As a specific example, tube bank 29, including both sections 29a and 29b, may contain between 130 and 160 twelve foot tubes of four inch inside diameter.

In flowing downward through tube bank section 29b, the oil follows a path generally countercurrent to the stream of hot combustion gases arising within chamber 15, and during this course of its flow, the oil is heated comparatively rapidly to cracking temperature in the neighborhood of 900° F., or somewhat above. After being raised to cracking temperature, the oil then is held at high temperature over an extended period of time during the course of its upward flow through section 29a of the tube bank. As stated in the introductory part of the description, the purpose of maintaining the oil in a prolonged path of flow while being held at or near cracking temperature, is to enable the cracking reaction to continue to the fullest extent under the existing temperature and pressure conditions. Neglecting consideration of the increased volume of the oil due to vaporization in the tubes, it will be noted that the oil will remain in tube bank section 29a around two and one half times as long as in section 29b. Due to the fact that the lower end of section 29a is subjected to the hottest combustion gases in chamber 15, and since the gases will have become somewhat cooled before reaching the upper tubes, the oil temperature may lower somewhat in flowing upwardly through the tubes. However, the temperature drop will be comparatively small and the oil at the point of discharge from the tube will remain at cracking temperature. As an example, the oil flowing into outlet line 30 may be in the neighborhood of from 875° F. to 950° F.

The oil and vapor mixture passes from the still through outlet line 30 to a separating chamber 31 within which a pressure in the neighborhood of 150 lbs. per sq. inch is maintained, the vapors being released through line 32 for further treatment to produce gasoline and heavier fractions, and the residuum being drawn off through line 33. An orifice fitting 34 is placed in outlet line 30, this fitting preferably being in the form of a valve in which the movable valve member consists of an orifice plate. The valve, shown in detail in Fig. 2, is of the gate type and comprises a body 35 and a vertically adjustable plate 36 operated by screw 37. Plate 36 has a central orifice 38 which, in an installation where the cracking tube and outlet line are of four inch inside diameter pipe, is about one and one half inches in diameter. During operation, the valve plate 36 is in closed position as illustrated, with the oil vapors passing through the orifice 38. The latter, by virtue of the flow restriction presented, maintains a back pressure on the tube banks in the neighborhood of 500 lbs. per sq. inch. At the low pressure side of the valve and in the separator 31 a pressure around 150 lbs. per sq. inch is maintained.

The illustrated type of orifice is particularly advantageous by reason of the fact that screw 37 may be turned to raise the orifice plate to the point at which no restriction will be offered to fluid flow through the body of the valve and the entire outlet line will be unrestricted. This feature is provided in order that when it becomes necessary to clean and blow out the cracking tubes, the valve may be opened to permit free passage of the accumulated carbon through the outlet line. Then by turning down the screw 37, the orifice plate may be reset and operations resumed.

It will be understood that I have shown and described but one typical, though preferred, form of the invention, and that considered in its broad aspects, the invention may be embodied in other forms and constructions without departure from the intended spirit and scope of the appended claims.

I claim:

1. A still comprising opposed vertical walls forming a heating chamber, a bank of horizontally extending oil cracking tubes in said chamber, and means for feeding oil to said tube bank, the tubes in said bank being connected in series so that the oil flows downwardly through horizontal rows of a comparatively narrow, vertically extending section of the tubes, and then passes upwardly through horizontal rows of a comparatively wide adjacent vertically extending section of the tubes located directly between the first mentioned section and one of said vertical walls.

2. A still comprising opposed vertical walls forming a heating chamber, a bank of horizontally extending oil cracking tubes in said chamber, and means for feeding oil to said tube bank, the tubes in said bank being connected in series so that the oil flows downwardly through horizontal rows of a comparatively narrow, vertically extending section of the tubes, and then passes upwardly through horizontal rows of a comparatively wide adjacent vertically extending section of the tubes located directly between the first mentioned section and one of said vertical walls.

3. A still, comprising opposed vertical walls forming a heating chamber, a bank of horizontally extending oil cracking tubes in said chamber, and means for feeding oil to said tube bank, the tubes in said bank being connected in series so that the oil flows downwardly through horizontal rows of a comparatively narrow, vertically extending section of the tubes, and then passes upwardly through horizontal rows of a comparatively wide adjacent vertically extending section of the tubes located directly between the first mentioned section and one of said vertical walls.

the aggregate length of the tubes in the last mentioned section being substantially greater than the aggregate length of the tubes in the first mentioned section.

4. A still comprising opposed vertical walls forming a heating chamber, a bank of horizontally extending oil cracking tubes in said chamber, and means for feeding oil to said tube bank, the tubes in said bank being connected in series so that the oil flows downwardly through one relatively narrow vertically extending section of the tubes, and then passes upwardly through an adjacent relatively wide vertically extending section of the tubes located directly between the first mentioned section and one of said vertical walls, the aggregate length of the tubes in the last mentioned section being at least twice as great as the aggregate length of the tubes in the first mentioned section.

5. A still comprising spaced vertical walls forming a preheating zone and a heating chamber, preheating tubes in said zone, a bank of horizontally extending oil cracking tubes in said chamber, and means for passing oil from said preheating tubes to said tube bank, the tubes in said bank being connected in series so that the oil flows downwardly through horizontal rows of a comparatively narrow, vertically extending section of the tubes, and then passes upwardly through horizontal rows of a comparatively wide adjacent vertically extending section of the tubes located directly between the first mentioned section and one of said vertical walls.

6. A still comprising spaced vertical walls forming a preheating zone and a heating chamber, preheating tubes in said zone, a bank of horizontally extending oil cracking tubes in said chamber, means for separating vapors from the oil leaving the preheating tubes and before entry of the oil to said cracking tube bank, and means for passing oil from said preheating tubes to said tube bank, the tubes in said bank being connected in series so that the oil flows downwardly through horizontal rows of a comparatively narrow, vertically extending section of the tubes, and then passes upwardly through horizontal rows of a comparatively wide adjacent vertically extending section of the tubes located directly between the first mentioned section and one of said vertical walls.

7. A still comprising opposed vertical walls forming a heating chamber, a bank of horizontally extending oil cracking tubes in said chamber, means for feeding oil to said tube bank, the tubes in said bank being connected in series so that the oil flows downwardly through horizontal rows of a comparatively narrow, vertically extending section of the tubes, and then passes upwardly through horizontal rows of a comparatively wide adjacent vertically extending section of the tubes located directly between the first mentioned section and one of said vertical walls, an outlet pipe leading from the upper end of the last mentioned section and means in said outlet line forming an oil and vapor passing restriction of substantially smaller size than the cross-sectional area of the outlet pipe, and acting to maintain a predetermined back pressure on the oil in said cracking tubes.

8. A still comprising opposed vertical walls forming a heating chamber, a bank of horizontally extending oil cracking tubes in said chamber, means for feeding oil to said tube bank, the tubes in said bank being connected in series so that the oil flows downwardly through horizontal rows of a comparatively narrow, vertically extending section of the tubes, and then passes upwardly through horizontal rows of a comparatively wide adjacent vertically extending section of the tubes located directly between the first mentioned section and one of said vertical walls, and a burner positioned in the lower portion of said chamber so that the combustion gases flow upwardly and counter-current to the oil flowing downwardly through said comparatively narrow section of the tube bank, 9. A still comprising spaced vertical walls forming a preheating zone and a heating chamber, preheating tubes in said zone, a bank of horizontally extending oil cracking tubes in said chamber, means for passing oil from said preheating tubes to said tube bank, the tubes in said bank being connected in series so that the oil flows downwardly through horizontal rows of a comparatively narrow, vertically extending section of the tubes, and then passes upwardly through horizontal rows of a comparatively wide adjacent vertically extending section of the tubes located directly between the first mentioned section and one of said vertical walls, and a burner positioned in the lower portion of said chamber so that the combustion gases flow upwardly and counter-current to the oil flowing downwardly through said comparatively narrow section of the tube bank, and means for passing the combustion gases leaving said chamber through said preheating zone counter-current to the direction of oil flow through the preheating tubes.

WILLIAM T. HANCOCK.